No. 867,530.
PATENTED OCT. 1, 1907.
H. F. POPE.
PIPE CONNECTION FOR RAILWAY CARS.
APPLICATION FILED NOV. 8, 1906.
4 SHEETS—SHEET 2.
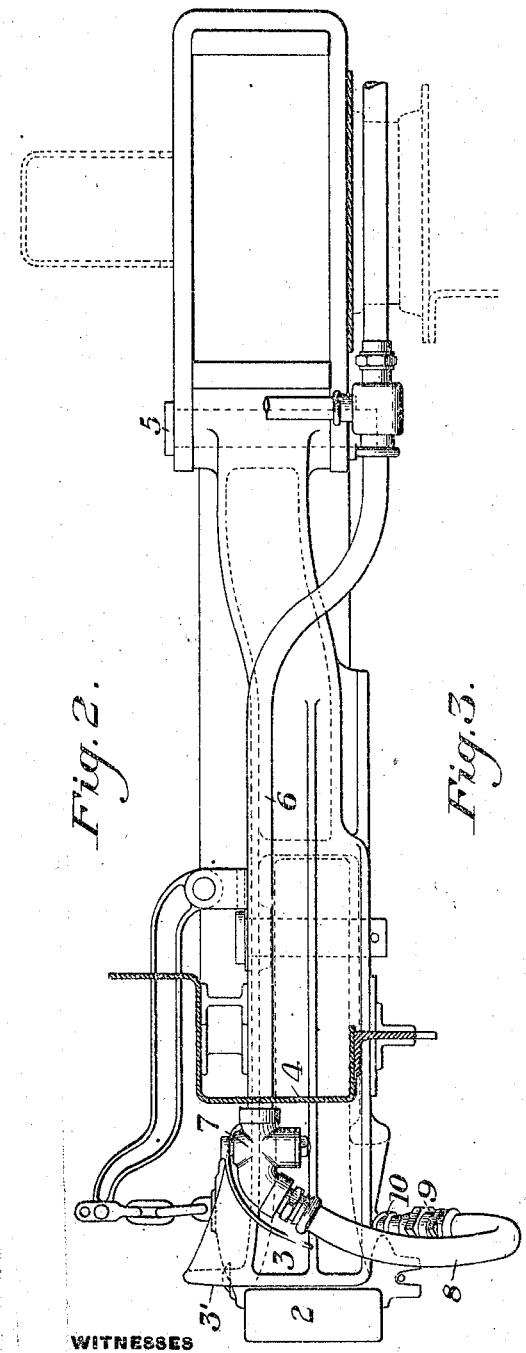
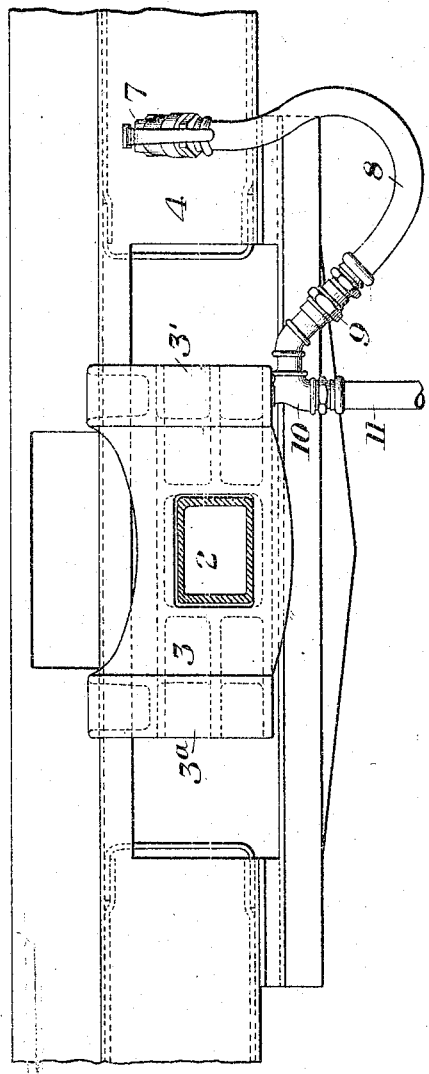
WITNESSES
INVENTOR

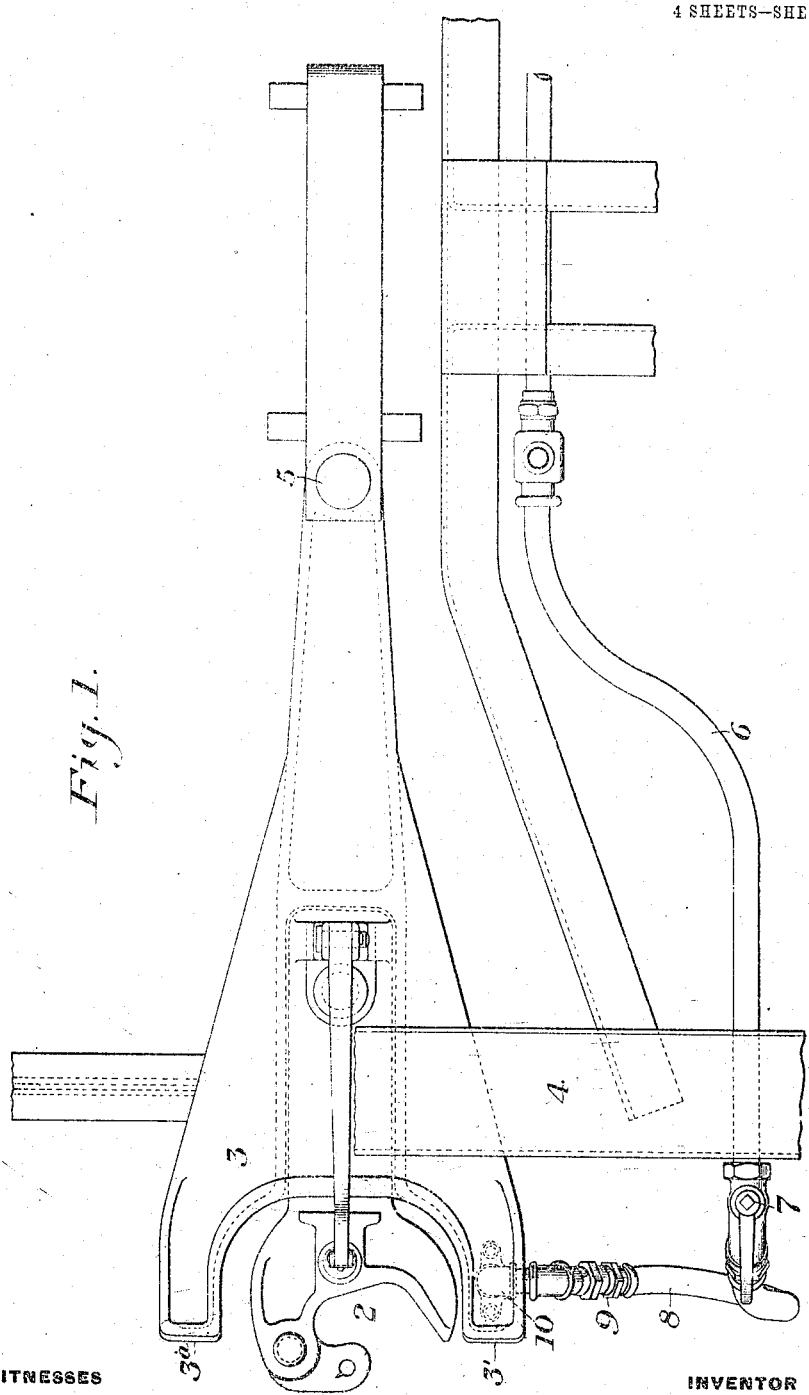

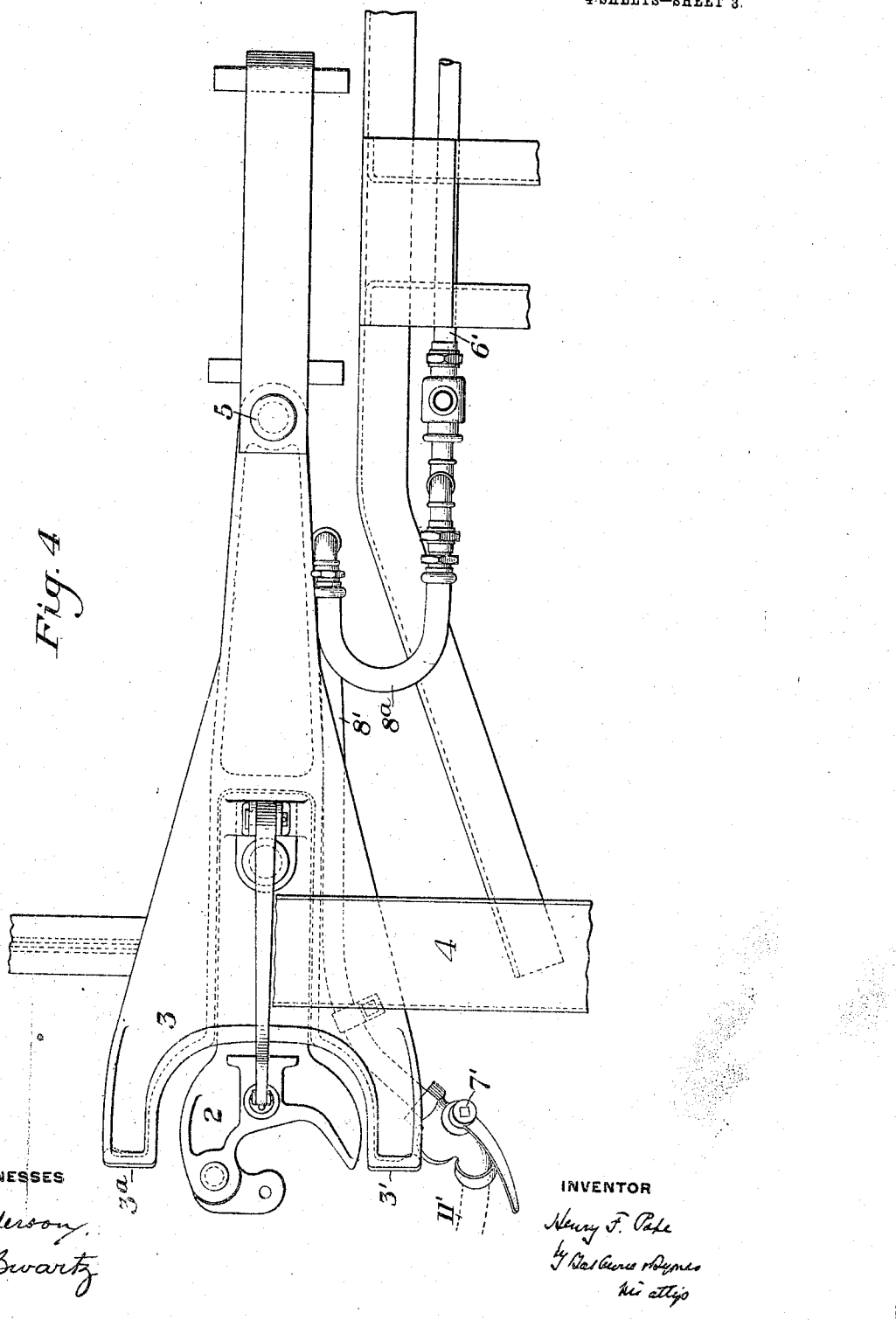

No. 867,530.  
PATENTED OCT. 1, 1907.  
H. F. POPE.  
PIPE CONNECTION FOR RAILWAY CARS.  
APPLICATION FILED NOV. 8, 1906.

4 SHEETS—SHEET 4.

WITNESSES  
R. A. Balderson  
W. W. Swartz

INVENTOR  
Henry F. Pope  
by Bakewell Byrnes  
his attys

UNITED STATES PATENT OFFICE.

HENRY F. POPE, OF CLEVELAND, OHIO, ASSIGNOR TO THE NATIONAL MALLEABLE CASTINGS COMPANY, OF CLEVELAND, OHIO, A CORPORATION OF OHIO.

PIPE CONNECTION FOR RAILWAY-CARS.

No. 867,530.  
Specification of Letters Patent.  
Patented Oct. 1, 1907.

Application filed November 8, 1906. Serial No. 342,497.

*To all whom it may concern:*

Be it known that I, HENRY F. POPE, of Cleveland, Cuyahoga county, Ohio, have invented a new and useful Pipe Connection for Railway-Cars, of which the following is a full, clear, and exact description, reference being had to the accompanying drawings, forming part of this specification, in which—

Figure 5:
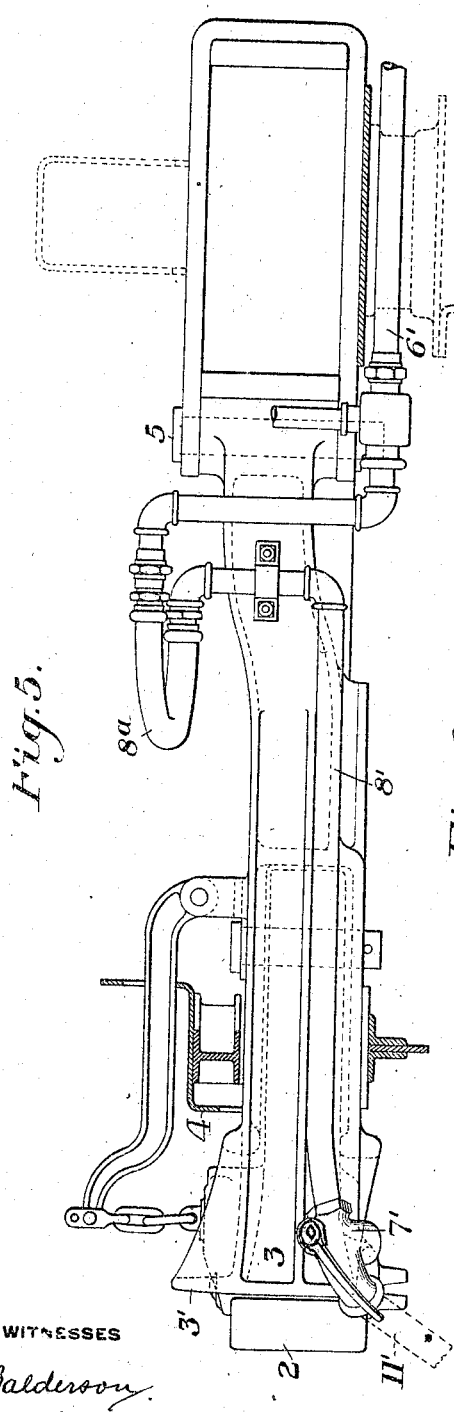
Figure 6:
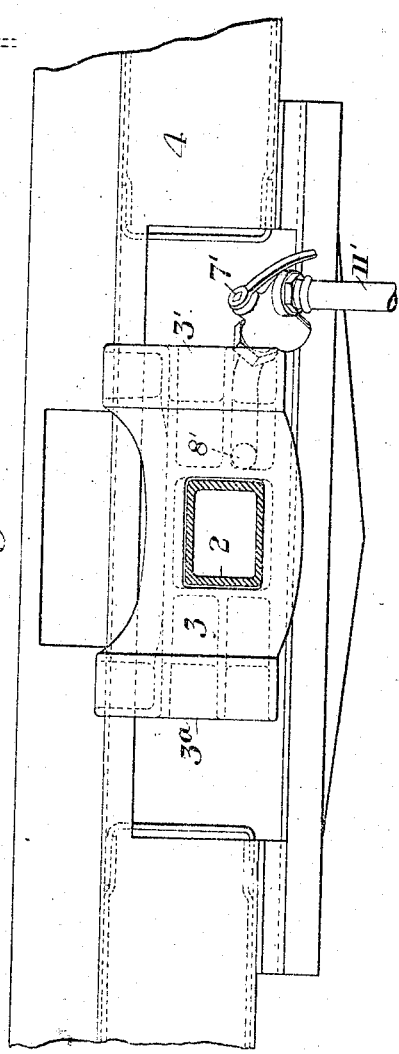

Figure 1 is a plan view of a car coupler and part of the end structure of a car, showing my invention; Fig. 2 is a sectional side elevation; Fig. 3 is a sectional front elevation; Figs. 4, 5 and 6 are similar to Figs. 1, 2 and 3, but illustrate a modified construction.

My invention is an improvement upon the devices for which I have made application for Letters Patent, Serial No. 317,361, No. 317,362, and No. 329,439, and can be used with the apparatus of any of said applications. It provides means by which air-brake couplings, or the couplings of steam pipes, electric cables, etc., can be applied readily and effectively to cars without undue length of flexible connections and without complication.

Referring to Figs. 1, 2 and 3, 2 is a coupler, and 3 a coupler-pocket within which the coupler is mounted, so as to afford lateral wings 3', 3ª at the sides of the coupler adapted to engage corresponding parts on an adjacent car; or the wings may be made integral with the coupler-head.

The pocket 3 is pivoted at 5 so as to swing radially with the coupler.

6 is the air-pipe which extends to the end sill 4 of the car, where it is fitted with a valve 7, and from this valve a piece of hose 8, or other flexible pipe, long enough to accommodate the swinging motion of the coupler, and provided with screw couplings 9 at the ends, extends to the wing 3' where it is screwed to a coupling 10 fixed to said wing. A hose-pipe 11 which couples with the hose-pipe of the adjacent car is attached to the coupling 10, and as it moves radially with the coupler-pocket it is always maintained at the same relative position as the hose of such car. This is true even when a car having a radially swinging coupler is coupled with an ordinary car, because the swinging coupler will be held by the other coupler and the hose of one car will therefore not be separated from the hose of the other.

Instead of the flexible pipe 11, any suitable automatic coupling device may be substituted, the requisite being that the hose coupling is carried radially with the coupler pocket or coupler wing, and thus maintained at all times in constant position relatively to the hose coupling of the adjacent car.

In the modification shown in Figs. 4, 5 and 6, a pipe 8' is attached to the coupler-pocket and extends longitudinally thereof from the train pipe 6' to which it is attached by a hose or flexible connection 8ª. At its front end the pipe 8' has a valve 7' also carried by the coupler-pocket, and from this valve a hose-pipe 11', or a suitable automatic coupling, extends to the coupling of an adjacent car.

Within the scope of my invention as defined in the claims, the parts may be modified, since what I claim is:—

1. A coupler mounted to swing radially and having a laterally projecting stop-wing, and a pipe coupling attached to the stop-wing and having a connection for an adjacent car and a yielding connection between the stop-wing and the train pipe.

2. A coupler mounted to swing radially and having stop-wings constituted by a separately formed pocket within which the coupler is set, and a pipe coupling attached to one of said wings and having a connection for an adjacent car.

3. A coupler mounted to swing radially and having a laterally projecting stop-wing, and a pipe coupling attached to said wing and having a connection for an adjacent car and a yielding connection extending to a coupling on the end structure of the car.

4. A coupler having a radially swinging pocket within which the coupler is mounted, a pipe-coupling attached to the pocket and adapted to connect with an adjacent car, and a yielding connection between the swinging pocket and the train-pipe.

In testimony whereof, I have hereunto set my hand.

HENRY F. POPE.

Witnesses:
HARRY E. ORR,
TRACY B. WILLIAMS.